United States Patent [19]

Okutsu et al.

[11] Patent Number: 5,684,528

[45] Date of Patent: Nov. 4, 1997

[54] CAMERA CONTROLLING APPARATUS FOR TELEVISION CONFERENCE SYSTEM

[75] Inventors: Noriko Okutsu; Youichi Ashida; Yu Jun Cui, all of Kawasaki, Japan

[73] Assignee: Fujitsu Limited, Kanagawa, Japan

[21] Appl. No.: 566,736

[22] Filed: Dec. 4, 1995

[30] Foreign Application Priority Data

Mar. 17, 1995 [JP] Japan .................................. 7-059541

[51] Int. Cl.⁶ .................................................. H04N 7/14
[52] U.S. Cl. ........................... 348/15; 348/17; 348/20
[58] Field of Search .......................... 348/13–20, 142, 348/143, 211, 212, 213; 379/102–105, 96–98, 202, 205, 207; H04N 7/15

[56] References Cited

U.S. PATENT DOCUMENTS

| | | | |
|---|---|---|---|
| 3,984,628 | 10/1976 | Sharp | 348/211 |
| 4,408,859 | 10/1983 | Fukahori et al. | 354/274 |
| 4,954,886 | 9/1990 | Elberbaum | 379/102 |
| 5,091,781 | 2/1992 | An | 358/169 |
| 5,289,090 | 2/1994 | Miller et al. | 348/143 |
| 5,412,417 | 5/1995 | Tozuka | 348/20 |
| 5,436,654 | 7/1995 | Boyd et al. | 348/15 |
| 5,479,203 | 12/1995 | Kawai et al. | 348/15 |
| 5,500,671 | 3/1996 | Anderson et al. | 348/15 |
| 5,526,037 | 6/1996 | Cortjens et al. | 348/15 |
| 5,528,289 | 6/1996 | Cortjens et al. | 348/15 |
| 5,568,183 | 10/1996 | Cortjens et al. | 348/15 |
| 5,583,565 | 12/1996 | Cortjens | 348/15 |
| 5,590,127 | 12/1996 | Bales et al. | 348/15 |
| 5,598,209 | 1/1997 | Cortjens et al. | 348/15 |

FOREIGN PATENT DOCUMENTS 0040488  2/1988  Japan .................................. 348/17

*Primary Examiner*—Curtis Kuntz
*Assistant Examiner*—Xu Mei
*Attorney, Agent, or Firm*—Helfgott & Karas, P.C.

[57] ABSTRACT

A camera controlling apparatus for a television conference system wherein the turning speed of a camera is varied in response to an operation mode. The camera controlling apparatus includes a preset control section for outputting a preset control signal for moving the camera at a first turning speed to a predetermined point, and a self room manual control section for outputting a self room manual control signal for moving the camera at a second turning speed lower than the first turning speed. The camera controlling apparatus further includes a reception manual control section for outputting a reception manual control signal for moving the camera at a third turning speed lower than the second turning speed in response to a manual signal transmitted thereto by way of a communication line. Any of the control signals is inputted to a speed control section, and the camera is controlled to be turned at a turning speed represented by the thus inputted control signal by the speed control section.

19 Claims, 7 Drawing Sheets

CAMERA CONTROLLING APPARATUS FOR TELEVISION CONFERENCE SYSTEM

BACKGROUND OF THE INVENTION

1. Field of the Invention

This invention relates to a camera controlling apparatus for a television conference system.

2. Description of the Related Art

A camera controlling apparatus for a television conference system includes a bidirectional video line and a bidirectional audio line which interconnect different conference rooms in each of which a camera, a television receiver, a microphone and a loudspeaker are installed. As a television conference system spreads widely, the operability of a camera during use of the system makes an important subject. Above all, a turning control of a camera by operation of it is an important factor to reflect members, a blackboard and so forth on a monitor of a television receiver in a procedure of a conference. Thus, the operability of a camera has a significant influence on the procedure of a conference and so forth. Therefore, a camera controlling apparatus which provides a good operability to a camera is demanded.

FIG. 9 shows a schematic block diagram showing a general construction of a conventional camera controlling apparatus for a television conference system. It is to be noted that, in FIG. 9, microphones, loudspeakers and an audio line are omitted for simplified illustration. Referring to FIG. 9, reference numerals 1 and 2 denote each a conference room. Installed in each of the conference rooms 1 and 2 are a camera denoted at 3 or 4, a turning apparatus denoted at 5 or 6, a monitor denoted at 7 or 8, a camera controlling apparatus denoted at 9 or 10, and a manual operation apparatus 11 or 12 such as a keypad or a keyboard. The camera controlling apparatus 9 and 10 are connected to each other by way of a video line 13.

Since both of the conference rooms 1 and 2 include similar components, description of the components of one of the conference rooms 1 and 2 will be given below. The turning apparatus 5 turns the camera 3 over 360 degrees or a predetermined angle. The camera controlling apparatus 9 controls the turning motion of the turning apparatus 5 in accordance with an instruction from the manual operation apparatus 11 which is manually operated by a person. Consequently, the camera 3 is turned by the control of the camera controlling apparatus 9. The turning motion of the camera 3 is controlled also by the manual operation apparatus 12 of the other party conference room 2.

The camera controlling apparatus 9 has a monitor display control function, a CODEC (Coder and Decoder) function and a communication control function. The camera controlling apparatus 9 performs various controls including a control to transmit a control signal for controlling the turning motion of the camera 4 of the other party conference room 2 to the other party camera controlling apparatus 10 by way of the video line 13, another control to encode a video signal obtained by imaging of the self conference room 1 by the camera 3 and transmit the video signal, a further control to decode a video signal transmitted thereto from the other party camera controlling apparatus 10, a still further control to reflect an image 14 of the other party conference room 2 corresponding to the decoded video signal on the monitor 7 of the self conference room 1, and a yet further control for picture-in-picture to reflect an image 15 of the self conference room 1 imaged by the self camera 3 on a portion of the image 14 reflected on the monitor 7.

Whether the camera controlling apparatus for a television conference system has the construction described above, in order to hold a conference with members in the other party conference room 2, not only the turning motion of the camera 3 of the self conference room 1 is controlled, but also the turning motion of the camera 4 of the other party conference room 2 is controlled by a remote operation to reflect a desired image on the monitor 7. By the way, in the conventional camera controlling apparatus for a television conference system described above, for example, whether the camera 3 is turned by an operation from the self conference room 1 or the camera 4 of the other party conference room 2 is turned by s remote operation, the speeds of the motion of the camera 3 and the camera 4 are fixed.

Therefore, when the other party camera 4 is turned to a desired position by a remote operation, if the speed of the movement of the other party camera 4 is high whereas the communication speed of the video line 13 is low, the image 14 of the other party conference room 2 displayed on the monitor 7 is displaced in time from an image actually imaged by the camera 4. Consequently, the conventional camera controlling apparatus for a television conference system is disadvantageous in that, if the displacement is large, then it is difficult to control the other party camera 4 while observing the image 14 to obtain an intended image. In such an instance, a smooth procedure of the conference cannot be anticipated.

A similar problem arises also when the number of transmission frames per unit time which relies upon the CODEC function is insufficiently small. On the other hand, when a turning movement of the camera 3 is to be performed, such a problem as arises upon a remote operation does not arise. However, if the speed of the turning motion of the camera 3 is insufficiently low, this gives rise to a different problem in that a smooth procedure of the conference cannot be satisfied.

SUMMARY OF THE INVENTION

Accordingly, it is an object of the present invention to provide a camera controlling apparatus for a television conference system wherein the turning speed of a camera is varied in response to an operation mode of the apparatus to assure a high operability in a camera control.

In accordance with an aspect of the present invention, there is provided a camera controlling apparatus for a television conference system wherein a camera and a monitor are installed in each of a self room and an other party room and wherein an image of the self room or the other party room is transmitted by way of a communication line and reflected on a monitor in the other party room or the self room, the camera controlling apparatus comprising preset control means for outputting a preset control signal for moving the camera at a first turning speed to a predetermined point, self room manual control means for outputting a self room manual control signal for moving the camera in the self room at a second turning speed lower than the first turning speed, reception manual control means for outputting a reception manual control signal for moving the camera in the self room at a third turning speed lower than the second turning speed in response to a manual signal transmitted thereto from the other party room by way of the communication line, and speed control means connected to the preset control means, the self room manual control means and the reception manual control means for turning the camera in the self room at a turning speed indicated by any of the preset control signal, the self room manual control signal and the reception manual control signal.

Preferably, the camera controlling apparatus further comprises a memory storing a relationship wherein a turning speed of the camera in the self room increases as a communication speed of the communication line increases, and detection means for detecting a communication speed of the communication line, the third turning speed being controlled based on the communication speed detected by the detection means.

Alternatively, the camera controlling apparatus may further comprise a memory storing a relationship wherein a turning speed of the camera in the self room increases as a number of transmission frames transmitted by the communication line increases, and detection means for detecting the number of transmission frames, the third turning speed being controlled based on the number of transmission frames detected by the detection means.

In accordance with another aspect of the present invention, there is provided a camera controlling apparatus for a television conference system wherein a camera and a monitor are installed in each of a self room and an other party room and an image of said self room or said other party room is transmitted by way of a communication line and reflected on said monitor in said other party room or said self room, said camera controlling apparatus, comprising: preset control means for outputting a preset control signal for moving said camera in said self room at a first turning speed to a predetermined point; self room manual control means for outputting a self room manual control signal for moving said camera in said self room at a second turning speed lower than the first turning speed; transmission manual control means for outputting a transmission manual control signal for moving said camera in said other party room at a third turning speed; means for transmitting said transmission manual control signal to a camera controlling apparatus in said other party room; and speed control means connected to said preset control means, said self room manual control means and said camera controlling apparatus in said other party room for turning said camera at a turning speed indicated by any of the preset control signal, the self room manual control signal and a transmission manual control signal transmitted from said other party room.

In accordance with a further aspect of the present invention, there is provided a camera controlling apparatus for a television conference system wherein a camera and a monitor are installed in each of a self room and an other party room and an image of said self room or said other party room is transmitted by way of a communication line and reflected on said monitor in said other party room or said self room, said camera controlling apparatus comprising: preset control means for outputting a preset control signal for moving said camera in said self room at a first turning speed to a predetermined point; self room manual control means for outputting a self room manual control signal for moving said camera in said self room at a second turning speed lower than the first turning speed in response to a manual signal transmitted thereto from said other party room by way of said communication line; reception manual control means for outputting a reception manual control signal for moving said camera in said self room at a third turning speed lower than the second turning speed in response to a manual signal transmitted thereto from said other party room by way of said communication line; speed control means connected to said preset control means, said self room manual control means and said reception manual control means for turning said camera in said self room at a turning speed indicated by any of the preset control signal, the self room manual control signal and the reception manual control signal; and reception manual signal discriminating means for discriminating whether a manual signal transmitted from said other party room through the communication line includes an information of a turning speed of said camera in the self room, said reception manual signal discriminating means sending the manual signal directly to said speed control means if the manual signal includes the information of the turning speed and sending the manual signal to said reception manual control means if the manual signal does not include the information of the turning speed.

The above and other objects, features and advantages of the present invention and the manner of realizing them will become more apparent, and the invention itself will be best understood, from a study of the following description and appended claims with reference to the attached drawings showing some preferred embodiments of the invention.

DESCRIPTION OF THE PREFERRED EMBODIMENTS

Figure 1:
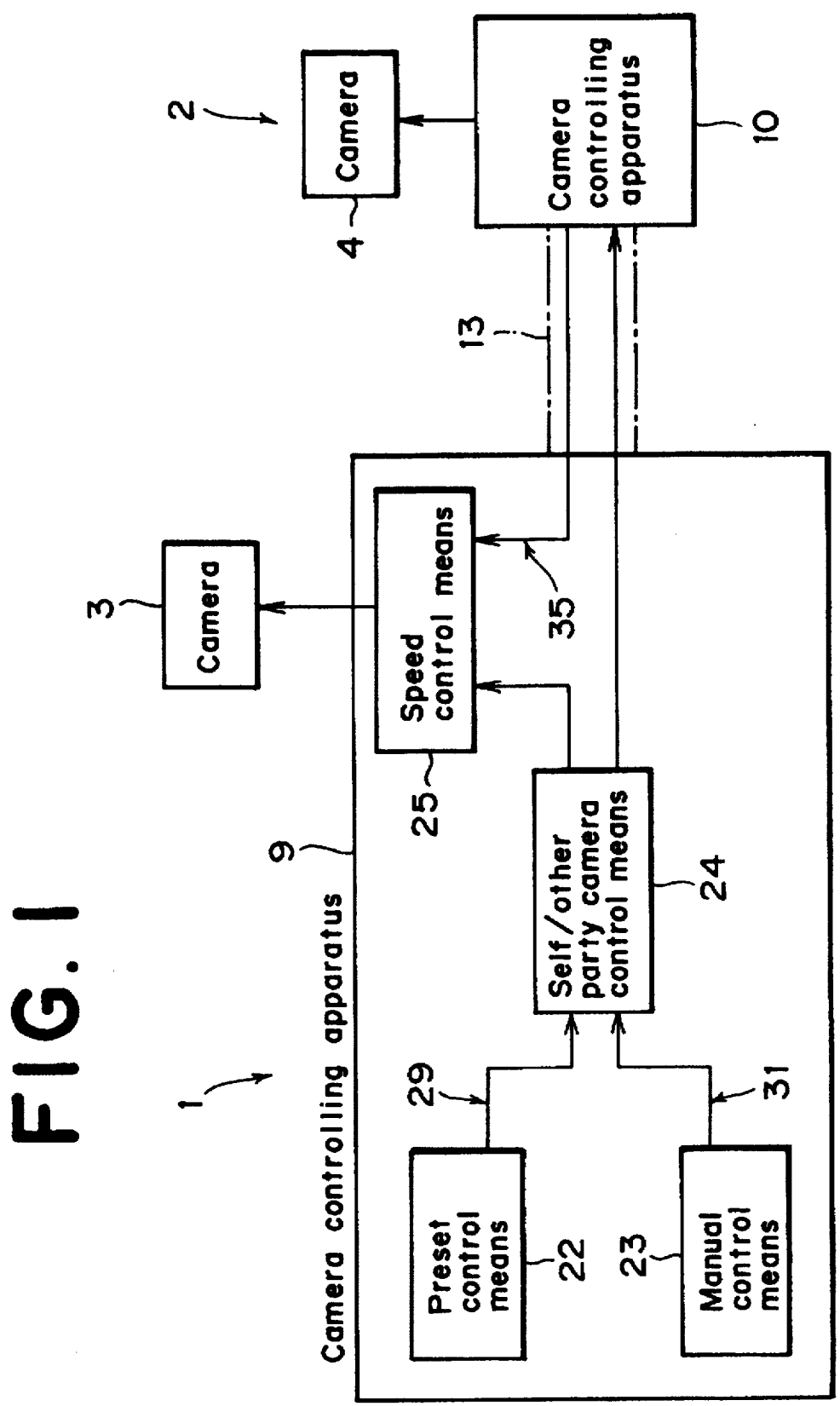
FIG. 1 is a block diagram illustrating a principle of the present invention.

FIG. 1 is a block diagram illustrating a principle of the present invention. A camera controlling apparatus for a television conference system shown in FIG. 1 is constructed such that cameras 3 and 4 and monitors not shown are installed in conference rooms 1 and 2, respectively, and an image of the self conference room 1 is imaged by the camera 3 and transmitted by way of a video line 13 so that it is displayed on the monitor of the other party conference room 2. The present invention is characterized in that means described below are provided for camera controlling apparatus 9 and 10 which perform imaging controls of the camera 3 and camera 4, respectively. However, since the camera controlling apparatus 9 and 10 have a common construction, only the construction of the camera controlling apparatus 9 is shown in FIG. 1.

Reference numeral 22 denotes preset control means which outputs, upon setting of a preset control to move the camera 3 at an arbitrary turning speed to a predetermined destination point, a preset control signal 29 for turning the camera 3 at the arbitrarily set turning speed to the predetermined destination point. Reference numeral 24 denotes self/other party camera control means, which outputs, upon setting of a camera control of the self room 1, a preset control signal 29 as a signal for a self room camera control, but outputs, upon setting of a camera control of the other party room 2, a preset control signal 29 as a signal for a control of the other party room camera to the communication line 13.

Reference numeral 25 denotes speed control means, which controls the turning movement of the camera 3 in response to one of the preset control signal 29 for a self room camera control and a preset control signal 35 for a control of the other party room camera transmitted thereto by way of the communication line 13 from the self/other party camera control means (not shown) of the other party room.

In addition to the components described above, the camera controlling apparatus 9 includes manual control means 23 which outputs, upon setting of a manual control for a camera turning movement, a manual control signal 31 for turning the camera at an arbitrarily set turning speed. Upon manual setting, the self/other party camera control means 24 outputs, upon setting of a camera control of the self room, a manual control signal 31 as a signal for a self room camera control, but outputs, upon setting of an other party room camera control, a manual control signal 31 for a control of the other party room camera to the video line 13. Further, the speed control means 25 controls the turning motion of the camera 3 in response to one of a manual control signal 31 for a self room camera control and a manual control signal (not shown) for a control of the other party room camera transmitted thereto from the self/other party camera control means of the other party room by way of the video line 13.

Further, the camera controlling apparatus 9 further includes storage means (not shown) which stores such a corresponding relationship between the communication speed of the communication line 13 and the turning speed of the camera 4 in accordance with which a displacement in time between a point of time of an image of the other party room displayed on the monitor of the self room not shown and another point of time at which the image was imaged by the other party camera 4, and detection means (not shown) for detecting the communication speed of the communication line 13. Preferably, the manual control means 23 reads out a turning speed corresponding to a communication speed detected by the detection means from the storage means and outputs a manual control signal for turning the camera 4 at the thus read out turning speed.

In the present invention, when the self room camera 3 is turned by a preset control, the operator will perform setting of a preset control and setting of a camera control of the self room 1 and then perform setting of a turning speed and a destination point of the self room camera 3. In response to such setting, a preset control signal 29 for turning the camera 3 at the set turning speed to the set destination point is outputted from the preset control means 22 to the self/other party camera control means 24. Since setting of a self room camera control has been performed, the preset control signal 29 is outputted from the self/other party camera control means 24 to the speed control means 25 of the self room 1, and the speed control means 25 causes the camera 3 to be turned at the set turning speed to the set destination point indicated by the preset control signal 29.

In order to turn the camera 4 of the other party room 2 by a preset control, the operator will perform setting of a preset control and setting of a camera control of the other party room 2 and further perform setting of a turning speed and a destination point of the other party room camera 4. In this instance, a preset control signal 29 outputted from preset control means 22 is sent out into the video line 13 by way of the self/other party camera control means 24 and outputted to the other party camera controlling apparatus 10. Then, the speed control means 25 of the camera controlling apparatus 10 causes the other party room camera 4 at the set turning speed to the set destination point indicated by the preset control signal 29.

On the other hand, in order to turn the self room camera 3 by a manual control, the operator will perform setting of a manual control and setting of a camera control of the self room 1 and further perform setting of a turning speed of the self room camera 3. As a result of such setting, a manual control signal 31 for turning the camera 3 at the set turning speed is outputted from the manual control means 23 to the self/other party camera control means 24. Since setting of a self room camera control has been performed, the manual control signal 31 is outputted from the self/other party camera control means 24 to the speed control means 25 of the self room 1, and the speed control means 25 causes the camera 3 to be turned at the set turning speed indicated by the manual control signal 31. In this instance, however, an operation to stop the camera 3 at a desired position is required.

Further, in order to turn the other party room camera 4 by a manual control, the operator will perform setting of a manual control and setting of a camera control of the other party room 2 and further perform setting of a turning speed of the other party room camera 4. As a result of such setting, a manual control signal 31 for turning the camera 4 at the set turning speed is outputted from the manual control means 23 and sent out into the video line 13 by way of the self/other party camera control means 24 so that it is outputted to the camera controlling apparatus 10. Then, the speed control means 25 of the camera controlling apparatus 10 turns the camera 4 at the set turning speed indicated by the manual control signal 31. However, also in this instance, an operation to stop the camera 4 at a desired position is required.

Furthermore, in order to turn the other party room camera 4 by a manual control, the manual control means 23 reads out from the storage means a turning speed corresponding to a communication speed detected by the detection means, that is, a turning speed of the other party from camera 4 corresponding to the communication speed of the communication line 13 in accordance with which a displacement in time between a point of time of an image of the other party room displayed on the self room monitor and another point of time at which the image was imaged by the other party room camera 4 does not have an operation by a manual control. Then, the manual control means 23 outputs a manual control signal 31 for turning the camera 4 at the thus read out turning speed. Consequently, such a situation that an intended image cannot be obtained due to the fact that the image of the other party room 2 displayed on the self room monitor is displaced in time from the image actually imaged by the camera 4 is eliminated.

Figure 2:
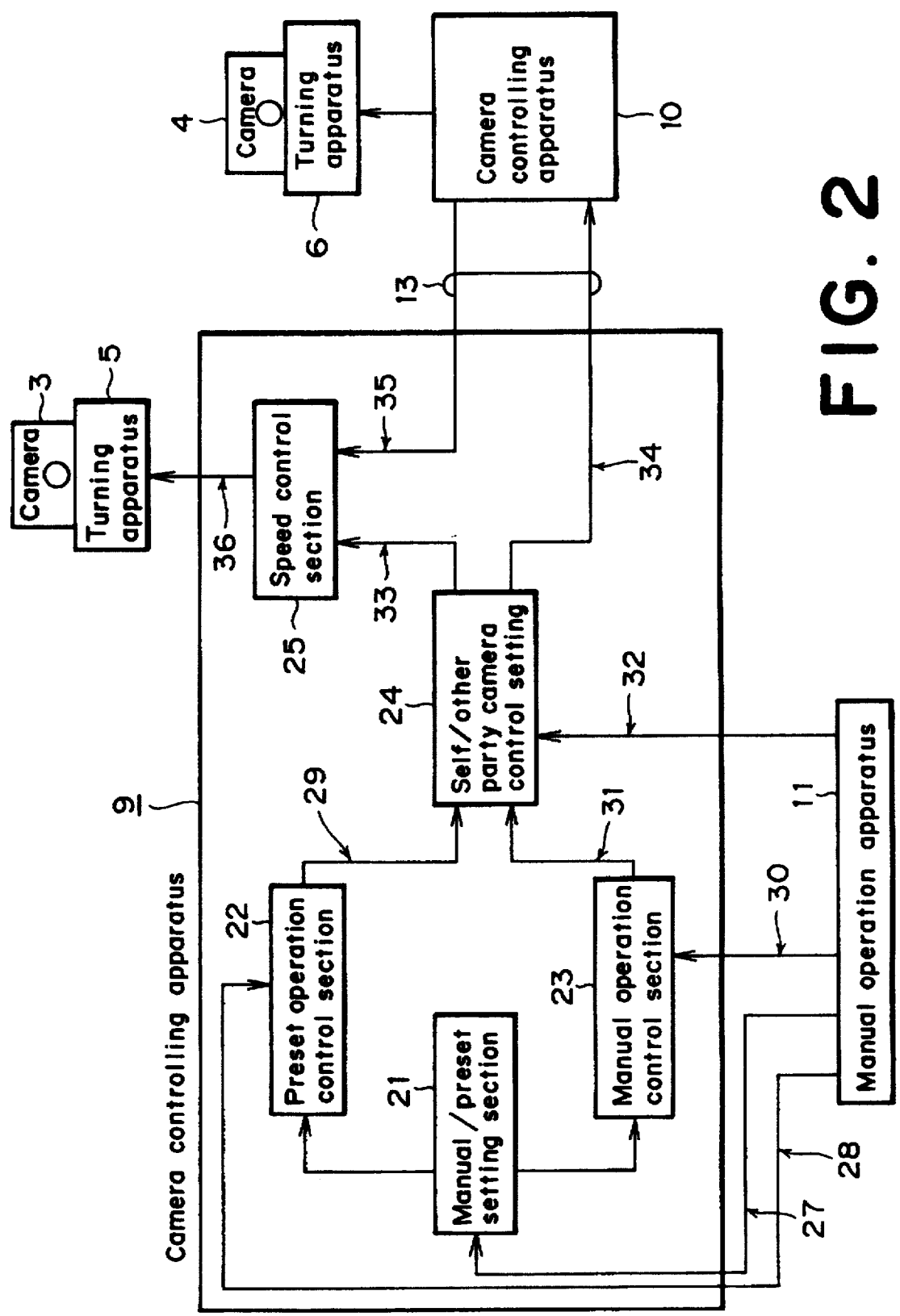
FIG. 2 is a block diagram showing a construction of a camera controlling apparatus for a television conference system according to a first embodiment of the present invention.
Figure 9:
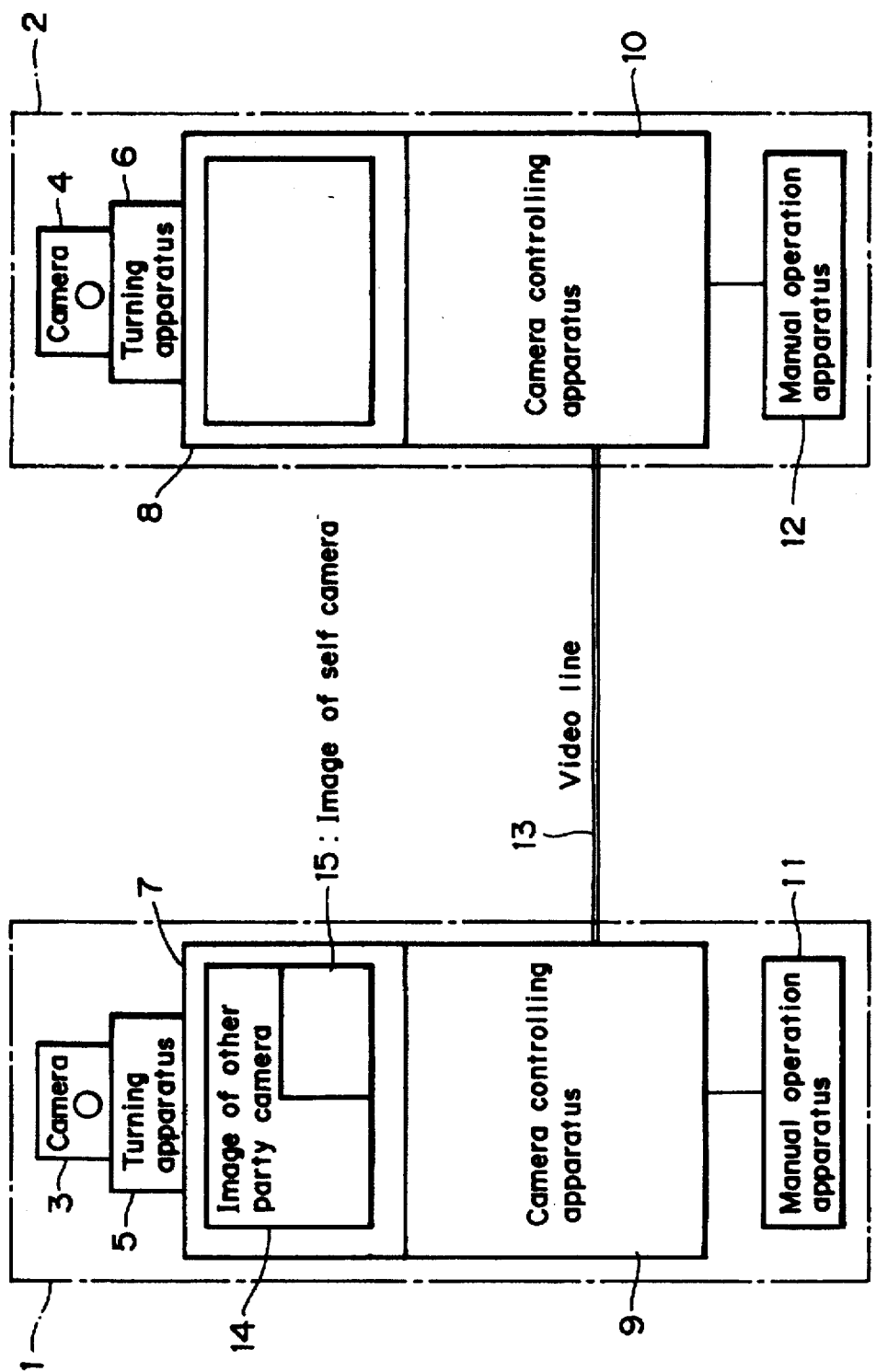
FIG. 9 is a block diagram of a conventional camera controlling apparatus for a television conference system.

FIG. 2 is a block diagram showing a construction of a camera controlling apparatus for a television conference system according to a first preferred embodiment of the present invention. Those elements corresponding to common components of the conventional apparatus shown in FIG. 9 are denoted by like reference numerals in FIG. 2, and overlapping description of them is omitted herein to avoid redundancy. Since camera controlling apparatus 9 and 10 of the embodiment shown in FIG. 2 have a same construction, components only of the camera controlling apparatus 9 are shown in FIG. 2. The camera controlling apparatus 9 shown in FIG. 2 includes a manual/preset setting section 21, a preset operation control section 22, a manual operation control section 23, a self/other party camera control setting section 24, and a speed control section 25.

The manual/preset setting section 21 sets it in response to a manual/preset setting signal 27 whether, when the self camera 3 or the other party camera 4 is to be turned by the turning apparatus 5 or 6, the turning movement is to be performed by a preset control or a manual control. The preset control is a control to move, when the camera 3 or 4 is to be turned, the camera 3 or 4 at a turning speed set arbitrarily to a predetermined destination point. The turning speed in this instance should be as high as possible since the destination point of the camera is defined, and accordingly, it is effective to set the turning speed to a speed equal to or in the proximity of a maximum allowable turning speed of the turning apparatus 5. The manual control is a control to move the camera 3 or 4 to a desired position while the camera 3 or 4 is manually operated at a fixed rate designated arbitrarily by way of the manual operation apparatus 11 by the operator. The manual/preset setting signal 27 indicates one of the preset control setting instruction or the manual control setting instruction, and various instructions are designated by the operator by way of the manual operation apparatus 11.

The preset operation control section 22 receives a preset operation instruction signal 28 indicating a turning speed and a destination point when an operator designates a turning speed and a destination point of the camera by way of the manual operation apparatus 11 after setting of a preset control has been performed by the manual/preset setting section 21. Then, the preset operation control section 22 outputs a preset operation control signal 29 for causing the camera 3 or 4 to perform a turning movement based on the turning speed and the destination point. However, the preset operation control section 22 may be constructed otherwise such that such turning speed and destination point are registered in advance and, when setting of a preset control is performed, the preset operation control section 22 outputs a preset operation control signal 29 for causing the camera 3 or 4 to perform a turning movement based on the turning speed and the destination point.

The manual operation control section 23 receives a manual operation instruction signal 30 indicating a turning speed and a direction of movement when an operator designates a turning speed and a direction of movement of the camera by way of the manual operation apparatus 11 after setting of a manual control is performed by the manual/preset setting section 21. Then, the manual operation control section 23 outputs a manual operation control signal 31 for causing the camera 3 or 4 to perform a turning motion at the turning speed in the direction of movement based on the thus inputted turning speed and direction of movement.

The self/other party camera control setting section 24 performs setting for controlling one of the self camera 3 and the other party camera 4 in response to a self/other party camera setting signal 32 inputted by way of the manual operation apparatus 11 by a designation of an operator. Upon setting of the self camera, the self/other party camera control setting section 24 outputs a self operation control signal 33 which indicates one of the preset operation control signal 29 and the manual operation control signal 31 to the speed control section 25. But upon setting of the other party camera, the self/other party camera control setting section 24 sends out an other party operation control signal 34 which indicates one of the preset operation control signal 29 and the manual operation control signal 31 to the camera controlling apparatus 10 of the other party side by way of the communication line 13.

The speed control section 25 outputs a speed control signal 36 in response to an self operation control signal 33 outputted from the self/other party camera control setting section 24 or an operation control signal 35 from the other party side camera controlling apparatus 10 transmitted thereto by way of the video line 13 to cause the turning apparatus 5 to perform a turning movement to control the turning motion of the camera 3.

With the construction described above, operation when the self camera 3 is to be turned by a manual control will first be described. First, an operator designates an instruction of setting of a manual control and designates an instruction of setting of a self camera using the manual operation apparatus 11. As a result of the designations, a manual/preset setting signal 27 indicating an instruction of setting of a manual control is inputted to the manual/preset setting section 21 so that a manual control setting condition is established. Meanwhile, a self/other party camera setting signal 32 indicating an instruction of setting of a self camera is inputted to the self/other party camera control setting section 24 so that a self camera control setting condition is established.

Then, the operator will designate a turning speed of the camera by way of the manual operation apparatus 11. In this instance, if the turning speed is set to an excessively high value, then it is difficult to stop the camera at a desired position, and therefore, the operator will designate a possible maximum speed at which the camera can be stopped at a desired position by a manual operation of the manual operation apparatus 11. It is assumed that, for example, the speed of 30 degrees per second is designated. When a manual operation instruction signal 30 indicating the instruction speed of 30 degrees per second is inputted to the manual operation control section 23, a manual operation control signal 31 for turning the camera at the speed of 30 degrees per second is outputted to the self/other party camera control setting section 24.

In this instance, since the self/other party camera control setting section 24 is in the self camera controlling setting condition, a manual operation control signal 31 is outputted as a self operation control signal 33 to the speed control section 25. In response to the self operation control signal 33, the speed control section 25 supplies to the turning apparatus 5 a speed control signal 36 for causing the turning apparatus 5 to perform a turning movement at the speed of 30 degrees per second. Here, if the operator inputs an instruction of a movement of the camera by way of the manual operation apparatus 11, the turning apparatus 5 performs a turning movement at the speed of 30 degrees per second. Consequently, the camera 3 performs a turning movement at the speed of 30 degrees per second. In this instance, a manual operation for a stopping instruction for stopping the camera 3 at a desired position is required.

On the other hand, when the camera 4 is to be turned by a manual control, not a self camera setting instruction but an other party camera setting instruction should be designated. In this instance, a self/other party camera setting signal 32 indicating an other party camera setting instruction is inputted to the self/other party camera control setting section 24 so that an other party camera control setting condition is established. Consequently, a manual operation control signal 31 is outputted as an other party operation control signal 34 to the camera controlling apparatus 10 by way of the video line 13.

Subsequently, an operation when the self camera 3 is to be turned by a preset control will be described. The operator will designate an instruction of setting of a preset control and designate an instruction of setting of a self camera by way of the manual operation apparatus 11. By those destinations, a signal 27 indicating a preset control setting instruction is inputted to the manual/preset setting section 21 so that a preset control setting condition is established. Meanwhile, a signal 32 indicating a self camera setting instruction is inputted to the self/other party camera control setting section 24 so that a self camera setting condition is established.

Then, if the operator performs a designation to cause the camera to perform a presetting operation by way of the manual operation apparatus 11, then a preset operation instruction signal 28 is inputted to the preset operation control section 22. Consequently, a preset operation control signal 29 for causing the camera to perform a turning movement by a preset control is outputted to the self/other party camera control setting section 24. The preset operation control signal 29 is a signal to cause the camera to perform a turning movement by 10 degrees at the speed of 60 degrees per second.

Since the self/other party camera control setting section 24 is in the self camera control setting condition, the preset operation control signal 29 is outputted as a self operation control signal 33 to the speed control section 25. In response to the self operation control signal 33, the speed control section 25 supplies to the turning apparatus 5 a speed control signal 36 for causing the turning apparatus 5 to perform a turning movement by 10 degrees at the speed of 60 degrees per second. Here, if the operator instructs a movement of the camera by way of the manual operation apparatus 11, then the turning apparatus 5 performs a turning movement by 10 degrees at the speed of 60 degrees per second. Consequently, the camera 3 performs a turning movement by 10 degrees at the speed of 60 degrees per second. In other words, the camera 3 can be stopped at a position turned by 10 degrees at the speed of 60 degrees per second by a single motion instruction.

When the other party camera 4 is to be turned by a preset control, not the self camera setting instruction described above but an other party camera setting instruction should be designated. In this instance, a self/other party camera setting signal 32 indicating an other party camera setting instruction is inputted to the self/other party camera control setting section 24 so that an other party camera control setting condition is established. Then, a preset operation control signal 29 is outputted as an other party operation control signal 34 to the other party camera controlling apparatus 10 by way of the video line 13. Also in this instance, similarly as in the preset control of the self camera 3, the camera 4 can be stopped at a position turned by 10 degrees at the speed of 60 degrees per second by a single motion instruction.

With the camera controlling apparatus for a television conference system of the first embodiment described above, when a neighboring operation to control the turning motion of the self camera 3 or a remote operation to control the turning motion of the other party camera 4 is to be performed, the self camera 3 or the other party camera 4 can be moved at a possible maximum speed, for example, at a maximum turning speed of the camera 4, over an arbitrarily determined rotational angle by a single operation instruction.

According to such an operation as described above, even if the turning speed of the camera 4 is high, since a displacement in time between an image 14 of the other party conference room 2 displayed on the self monitor 7 shown in FIG. 9 and an image actually imaged by the camera 4 does not have any influence on the operation as described hereinabove in connection with the conventional apparatus, an intended image can be obtained and a camera control in a conference can be performed smoothly. Further, according to the manual control, since a manual operation can be performed after the turning speeds of the cameras 3 and 4 are designated arbitrarily, when a turning movement of the camera 3 is performed, such a situation that a smooth procedure of the conference cannot be achieved because the speed of the turning movement of the camera 3 is insufficiently low as in the conventional apparatus is eliminated.

By the way, when the turning movement of the other party camera 4 is to be manually controlled, a displacement in time between the image 14 of the other party conference room 2 displayed on the monitor 7 and the image actually imaged by the camera 4 has an influence on the operation as described above. Such displacement in time arises in the first place when the speed of the movement of the other party camera 4 is high while the communication speed of the video line 13 is low. The displacement in time arises in the second time when the number of transmission frames per unit time is excessively small.

Since the line communication speed is different depending upon the system, when the communication speed is high, if no such displacement in time as described above arises, the turning movement of the camera 4 can be raised as much. In particular, a relationship between the communication speed and the turning speed at which no such displacement as described above arises is determined as seen in FIG. 3 in advance, and the camera 4 can be turned at a maximum allowable turning speed corresponding to a communication speed based on the relationship. If the communication speed is lower than S1, then the turning movement is set to L1, but if the communication speed is within the range between S2 and S3, then the turning movement is set to L3, or if the communication speed is higher than Sm, then the turning movement is set to Ln. As a result of such setting, the camera 4 can be moved at a maximum allowable turning speed corresponding to the communication speed of the video line 13.

Figure 4:
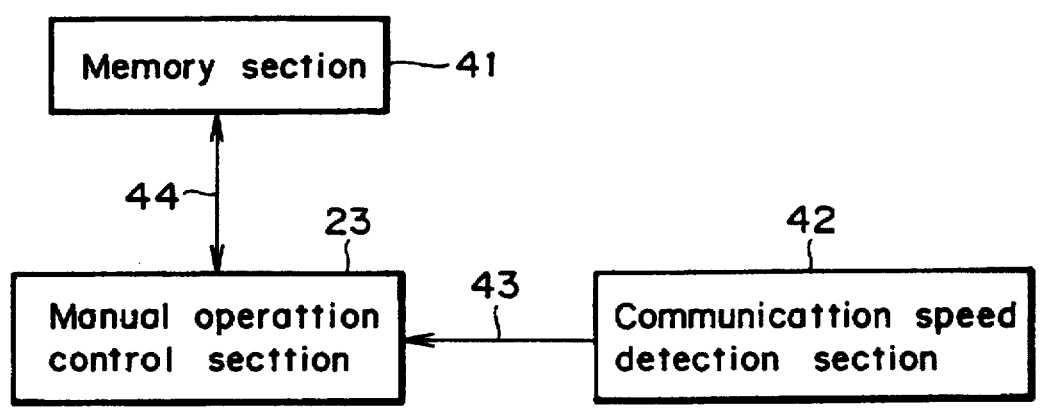
FIG. 4 is a block diagram showing a construction for setting a camera turning speed.

In order to realize this, as shown in FIG. 4, a memory section 41 in which an information table indicating the relationship between the communication speed and the turning speed at which no such displacement as described above arises is stored and a communication speed detection section 42 for detecting the communication speed of the video line 13 are connected to the manual operation control section 23. The manual operation control section 23 thus reads out from the memory section 41 a turning speed 44 corresponding to communication speed information 43 detected by the communication speed detection section 42, and outputs to the self/other party camera control setting section 24 a manual operation control signal 31 which instructs to perform a turning movement of the camera at the turning speed 44.

Figure 5:
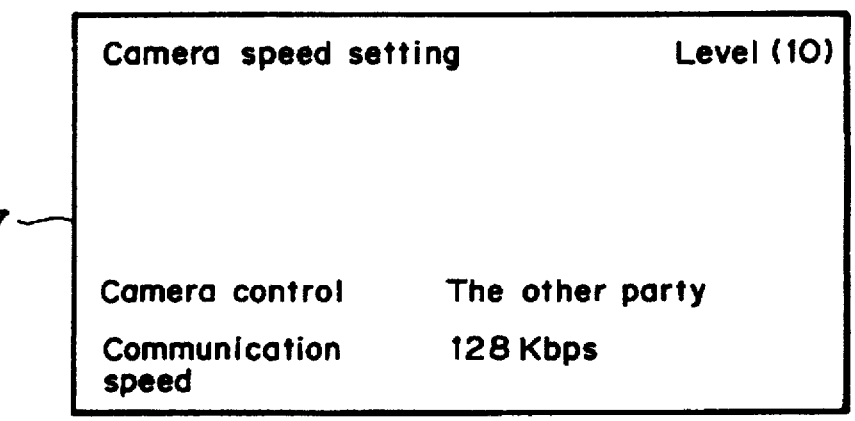
FIG. 5 is a schematic view illustrating a display of a monitor upon manual setting of a camera turning speed.

Here, the communication speed is detected and used to automatically set a turning speed. However, the turning speed may alternatively be set manually in response to detection information of the communication speed. In this instance, image display processing means not shown causes the monitor 7 to display a setting picture for setting a turning speed and display contents of the information table of the memory section 41 described above as shown in FIG. 5. Then, the speed corresponding to the communication speed information 43 detected by the communication speed detection section 42 is displayed like 128 Kbps as seen in FIG. 5, and a turning speed corresponding to the displayed speed will be set like level (10) by the operator.

On the other hand, while the number of transmission frames relies upon the CODEC function not shown of the camera controlling apparatus 10, as the transmission frame number increases, the turning speed can be raised as much. In particular, a relationship between the transmission frame number and the turning speed at which no such displacement in time as described above arises is determined as seen in FIG. 6 in advance, and the camera 4 can be turned at a maximum allowable turning speed corresponding to the transmission frame number based on the relationship thus determined. When the transmission frame number is smaller than F1, the turning speed is set to L1, but when the transmission frame number is within the range between F2 and F3, the turning speed is set to L3, or when the transmission frame number is higher than Fm, the turning speed is set to Ln. By such setting, the camera 4 can be moved at a maximum allowable turning speed corresponding to the transmission frame number.

Figure 7:
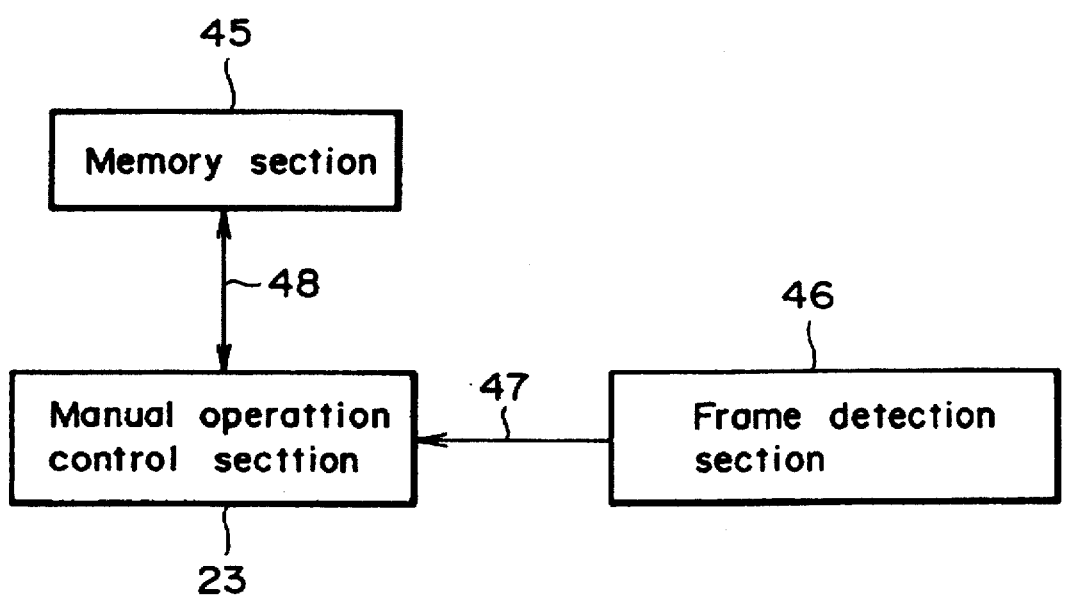
FIG. 7 is a block diagram showing another construction for setting a camera turning speed.

In order to realize this, a memory section 45 in which an information table indicating the relationship between the transmission frame number and the turning speed at which no such displacement in time as described above arises is stored and a frame detection section 46 for detecting the number of transmission frames are connected to the manual operation control section 23 as seen in FIG. 7. Then, the manual operation control section 23 reads out from the memory section 45 a turning speed 48 corresponding to transmission frame number information 47 detected by the frame detection section 46 and outputs to the self/other party camera control setting section 24 a manual operation control signal 31 which instructs to perform a turning movement of the camera at the turning speed 48.

Here, the transmission frame number is detected and used to automatically set the turning speed. Alternatively, however, the turning speed may be set manually in response to transmission frame number detection information. In this instance, the image display processing means not shown causes the monitor 7 to display a setting picture for setting a turning speed and display contents of the information table of the memory section 45 described above as shown in FIG. 5. It is to be noted, however, that, while a communication speed is displayed in FIG. 5, the transmission frame number is displayed there instead. Then, the number of transmission frames corresponding to the transmission frame number information 47 detected by the frame detection section 46 is displayed on the monitor 7, and a turning speed corresponding to the displayed transmission frame number is set like level (10) by the operator.

Figure 8:
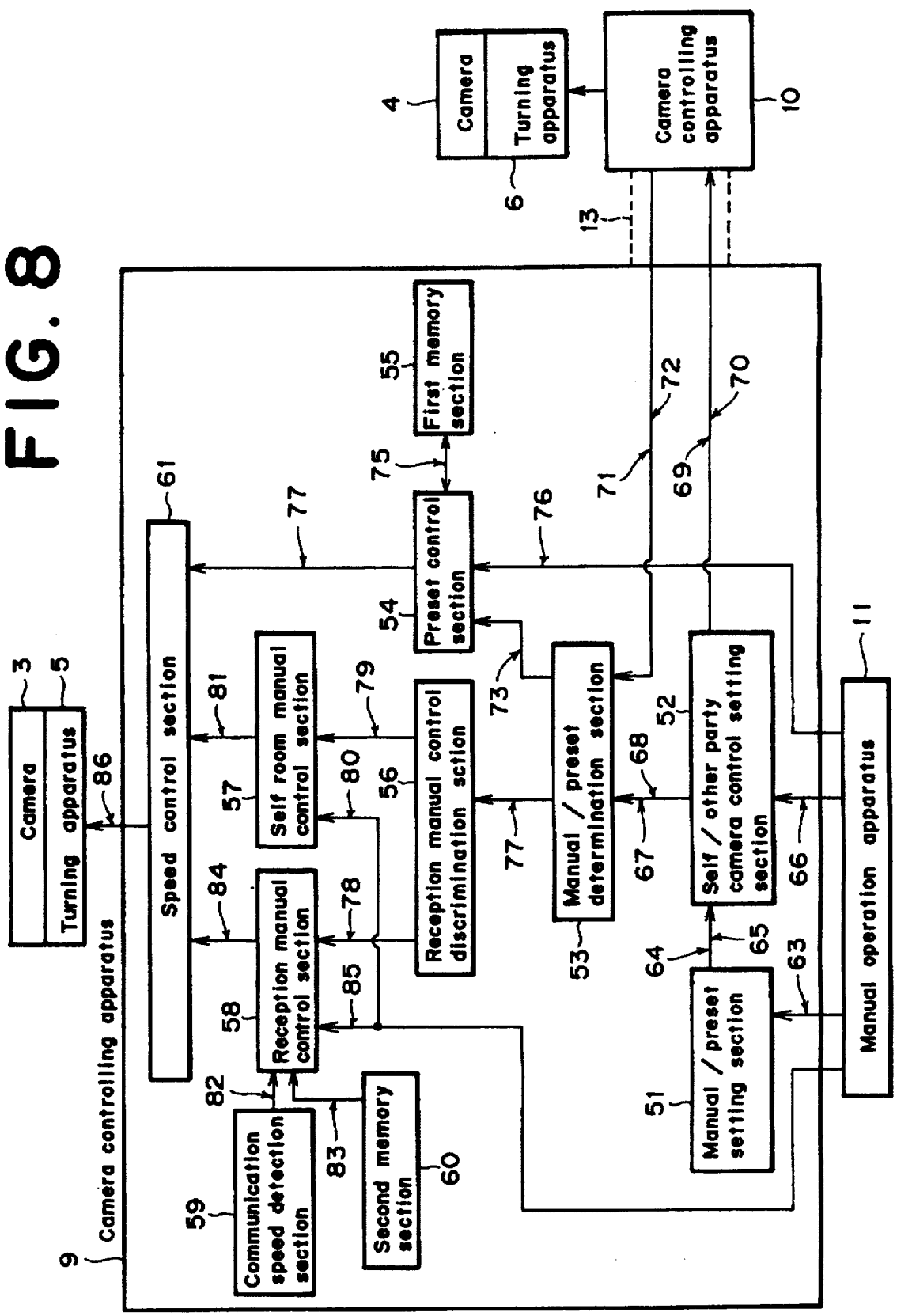
FIG. 8 is a block diagram showing a construction of a camera controlling apparatus for a television conference system according to a second embodiment of the present invention.

Subsequently, a second embodiment will be described with reference to FIG. 8. It is to be noted that those elements corresponding to common components of the first embodiment shown in FIG. 2 are denoted by like reference numerals in FIG. 8, and overlapping description of them is omitted herein to avoid redundancy. The camera controlling apparatus 9 shown in FIG. 8 includes a manual/preset setting section 51, a self/other party camera control setting section 52, a manual/preset determination section 53, a preset control section 54, a first memory section 55, a reception manual control discrimination section 56, a self room manual control section 57, a reception manual control section 58, a communication speed detection section 59, a second memory section 60, and a speed control section 61.

When the self camera 3 or the other party camera 4 is to be turned by way of the turning apparatus 5 or 6, the manual/preset setting section 51 sets whether such turning movement should be performed by a preset control or a manual control in response to a manual/preset control signal 63 outputted from the manual operation apparatus 11 and indicating a preset control or a manual control. When a manual control is to be set, the manual/preset setting section 51 outputs a manual control signal 64, but when a preset control is to be set, the manual/preset setting section 51 outputs a preset control signal 65.

When the manual/preset control signal 63 represents information for performing a manual control, the information indicates a starting direction of a movement of the camera 3 or 4 or stopping of such movement, and a manual control signal 64 indicating the contents is outputted. When the manual/preset control signal 63 is information for performing a preset control, the information indicates a destination point flag of the camera 3 or 4, and a preset control signal 65 indicating such contents is outputted.

The self/other party camera control setting section 52 performs setting to control one of the self camera 3 and the other party camera 4 in response to a self/other party camera setting signal 66 outputted from the manual operation apparatus 11. Thus, when the self/other party camera control setting section 52 performs setting of the self camera 3, it outputs a manual control signal 67 or a preset control signal 68 to the manual/preset determination section 53, but when the self/other party camera control setting section 52 performs setting of the other party camera 4, it sends out a manual control signal 69 or a preset control signal 70 to the camera controlling apparatus 10 on the other party side by way of the communication line 13.

The manual/preset determination section 53 determines a manual control or a preset control based on a manual control signal 67 or a preset control signal 68 outputted from the manual/preset determination section 53 or on a manual control signal 71 or a preset control signal 72 transmitted thereto from the camera controlling apparatus 10 on the other party side by way of the communication line 13.

The preset control section 54 reads out destination point information 75 from the first memory section 55 in accordance with a destination point flag indicated by a preset control signal denoted by reference numeral 73 transmitted thereto when a preset control is determined by the manual/preset determination section 53. Then, the preset control section 54 outputs to the speed control section 61 a preset operation control signal 74 for turning the camera 3 at a first turning speed to a destination point indicated by the information 75. The turning speed is either set by the preset control section 54 in advance as described above or set in response to a turning speed setting signal 76 by an operator operating the manual operation apparatus 11.

The reception manual control discrimination section 56 discriminates whether or not a manual control signal denoted by reference numeral 77 sent thereto when a manual control is determined by the manual/preset determination section 53 has been sent thereto from the camera controlling apparatus 10 by way of the communication line 13. If the result of the determination is such that the preset operation control signal 77 is a manual control signal 71 sent thereto from the other party side, a manual control signal 78 from the other party room is outputted to the reception manual control section 58, but in any other case, a manual control signal 79 from the self room is outputted to the self room manual control section 57.

The self room manual control section 57 outputs a first manual operation control signal 81 causing the camera 3 to be moved at a second turning speed which is slower than the first turning speed in a direction indicated by movement starting direction information represented by the manual control signal 79 from the self room or for stopping such movement in response to movement stopping information to the speed control section 61. The second turning speed can be set arbitrarily by way of a turning speed signal 80 which is outputted from the manual operation apparatus 11 by a manual operation of the operator.

Figure 3:
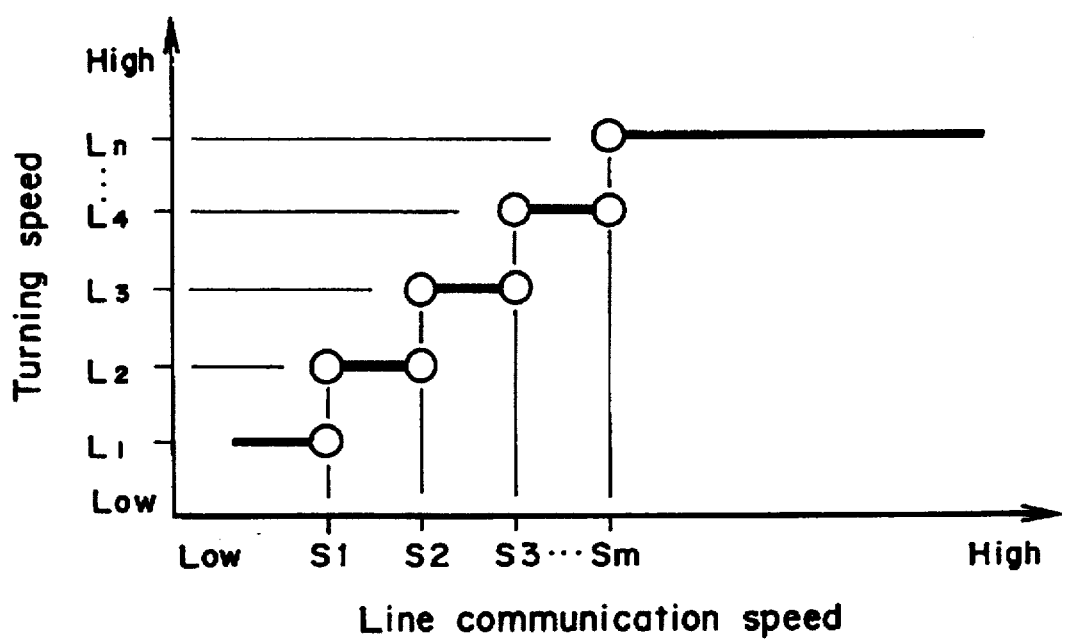
FIG. 3 is a diagram illustrating a relationship between a line communication speed and a camera turning speed.
Figure 6:
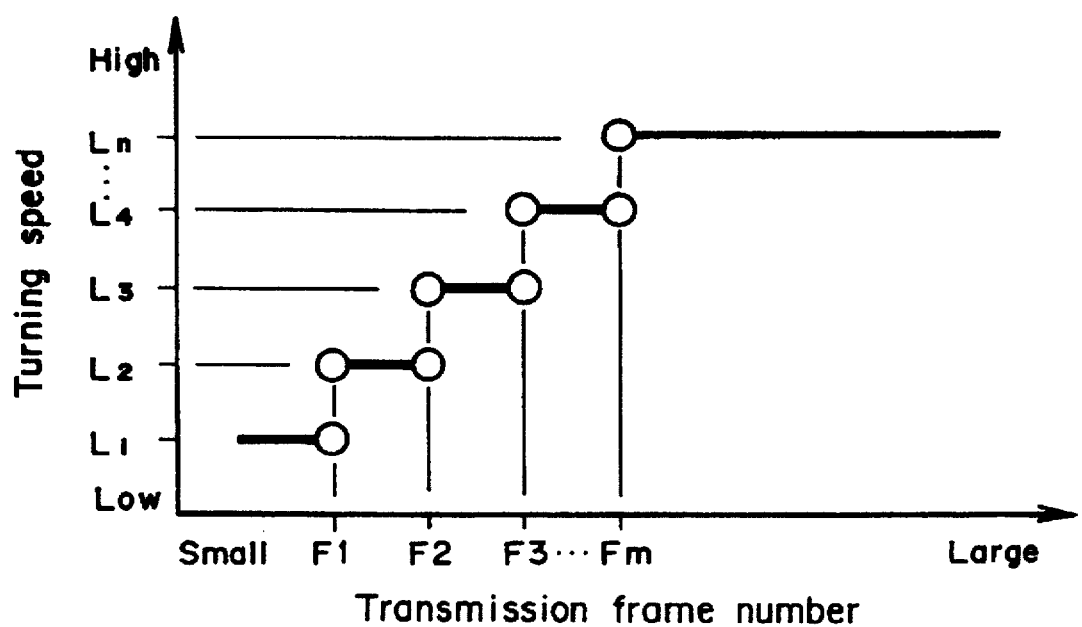
FIG. 6 is a diagram illustrating a relationship between a transmission frame number and a camera turning speed.

The reception manual control section 58 reads out, from the information table illustrated in FIG. 3 stored in the second memory section 60 and indicating the relationship between the communication speed and the turning speed at which no such displacement in time as described hereinabove in connection with the first embodiment arises, a third turning speed 83 corresponding to a communication speed 82 of the communication line 13 detected by the communication speed detection section 59. Then, the reception manual control section 58 outputs to the speed control section 61 a manual operation control signal 84 for moving the camera 3 at the third turning speed 83 in a direction indicated by the movement starting direction information represented by the manual control signal 78 from the other party room or for stopping the movement of the camera 3 in response to movement stopping information. The third turning speed 83 is set slower than the second turning speed and may be varied arbitrarily by way of a turning speed signal 85 outputted from the manual operation apparatus 11 by a manual operation of the operator.

Where alternatively the information table illustrated in FIG. 6 which indicates the relationship between the transmission frame number and the turning speed at which no such displacement in time as described hereinabove in connection with the first embodiment arises is stored in the second memory section 60, means for detecting a frame number is provided in place of the communication speed detection section 59, and the reception manual control section 58 reads out a turning speed corresponding to a frame number detected by the detecting means and outputs to the speed control section 61 a second manual operation control signal 84 for moving the camera 3 at the third turning speed in a direction indicated by the movement starting direction information represented by the manual control signal 78 from the other party room or for stopping the turning movement of the camera 3 in response to movement stopping information.

The speed control section 61 outputs an operation control signal 86 corresponding to one of the preset operation control signal 77, the first manual operation control signal 81 and the second manual operation control signal 84 to cause the turning apparatus 5 to perform a turning operation to control the turning movement of the camera 3.

Also in the second embodiment having the construction described above, similar advantages to those of the first embodiment can be anticipated. Further, when it is intended to remotely operate the camera on the other party side, if only a manual control signal or a preset operation control signal indicating such control command is transmitted, then the camera controlling apparatus of the other party side performs turning movement processing of the camera in accordance with the command, and consequently, the transmission capacity of the communication line 13 to be used upon a remote operation is reduced. According to the present invention, there is an advantage in that a camera can be moved readily at a possible maximum speed to a desired position whether it is a neighboring operation or a remote operation.

It is to be noted that the camera controlling apparatus 9 may be provided with a transmission manual control means in place of the reception manual control section 58 of the second embodiment. In this modification, the transmission manual control means outputs a transmission manual control signal for moving the camera 4 in the other party room at a third turning speed slower than the second turning speed and the transmission manual control signal is transmitted through the communication line 13 to control the turning speed of the other party camera 4.

What is claimed is:

1. A camera controlling apparatus for a television conference system wherein a camera and a monitor are installed in each of a self room and an other party room and an image of said self room or said other party room is transmitted by way of a communication line and reflected on said monitor in said other party room or said self room, said camera controlling apparatus comprising:

preset control means for outputting a preset control signal for moving said camera in said self room at a first turning speed to a predetermined point;

self room manual control means for outputting a self room manual control signal for moving said camera in said self room at a second turning speed lower than the first turning speed;

reception manual control means for outputting a reception manual control signal for moving said camera in said self room at a third turning speed lower than the second turning speed in response to a manual signal transmitted thereto from said other party room by way of said communication line; and speed control means connected to said preset control means, said self room manual control means and said reception manual control means for turning said camera in said self room at a turning speed indicated by any of the preset control signal, the self room manual control signal and the reception manual control signal.

2. A camera controlling apparatus according to claim 1, further comprising:

manual operation means for inputting contents of a control of said camera controlling apparatus;

manual/preset setting means for discriminating whether the input from said manual operation means indicates a manual control or a preset control and setting a manual control mode or a preset control mode based on the discrimination; and self/other party camera control means for discriminating whether the input from said manual operation means indicates a control of said camera in said self room or a control of said camera in said other party room and setting a control mode for said camera in said self room or another control mode for the camera in said other party room based on the discrimination.

3. A camera controlling apparatus according to claim 1, further comprising:

a memory connected to said reception manual control means and storing a relationship wherein a turning speed of said camera in said self room increases as a communication speed of said communication line increases; and detection means for detecting a communication speed of said communication line;

wherein the third turning speed is controlled based on the communication speed detected by said detection means.

4. A camera controlling apparatus according to claim 3, wherein the third turning speed increases stepwise as the communication speed increases.

5. A camera controlling apparatus according to claim 1, further comprising:

a memory connected to said reception manual control means and storing a relationship wherein a turning speed of said camera in said self room increases as a number of transmission frames transmitted by said communication line increases; and detection means for detecting the number of transmission frames;

wherein the third turning speed is controlled based on the number of transmission frames detected by said detection means.

6. A camera controlling apparatus according to claim 5, wherein the third turning speed increases stepwise as the number of transmission frames increases.

7. A camera controlling apparatus according to claim 1, wherein the first, second and third turning speeds are selected from within a menu displayed on said monitor in said self room.

8. A camera controlling apparatus according to claim 1, further comprising a memory connected to said preset control means and storing information indicating a position to which said camera in said self room is to be moved.

9. A camera controlling apparatus according to claim 2, wherein the first, second and third turning speeds are inputted by a manual operation of said manual operation means.

10. A camera controlling apparatus for a television conference system wherein a camera and a monitor are installed in each of a self room and an other party room and an image of said self room or said other party room is transmitted by way of a communication line and reflected on said monitor in said other party room or said self room, said camera controlling apparatus, comprising:

preset control means for outputting a preset control signal for moving said camera in said self room at a first turning speed to a predetermined point;

self room manual control means for outputting a self room manual control signal for moving said camera in said self room at a second turning speed lower than the first turning speed;

transmission manual control means for outputting a transmission manual control signal for moving said camera in said other party room at a third turning speed;

means for transmitting said transmission manual control signal to a comera controlling apparatus in said other party room; and speed control means connected to said preset control means, said self room manual control means and said camera controlling apparatus in said other party room for turning said camera at a turning speed indicated by any of the preset control signal, the self room manual control signal and a transmission manual control signal transmitted from said other party room.

11. A camera controlling apparatus according to claim 10, further comprising:

manual operation means for inputting contents of a control of said camera controlling apparatus;

manual/preset setting means for discriminating whether the input from said manual operation means indicates a manual control or a preset control and setting a manual control mode or a preset control mode based on the discrimination; and self/other party camera control means for discriminating whether the input from said manual operation means indicates a control of said camera in said self room or a control of said camera in said other party room and setting a control mode for said camera in said self room or another control mode for the camera in said other party room based on the discrimination.

12. A camera controlling apparatus according to claim 11, wherein the first, second and third turning speeds are inputted by a manual operation of said manual operation means.

13. A camera controlling apparatus according to claim 10, further comprising:

a memory connected to said transmission manual control means and storing a relationship wherein a turning speed of said camera in said other party room increases as a communication speed of said communication line increases; and detection means for detecting a communication speed of said communication line;

wherein the third turning speed is controlled based on the communication speed detected by said detection means.

14. A camera controlling apparatus according to claim 13, wherein the third turning speed increases stepwise as the communication speed increases.

15. A camera controlling apparatus according to claim 10, further comprising:

a memory connected to said transmission manual control means and storing a relationship wherein a turning speed of said camera in said other party room increases as a number of reception frames transmitted by said communication line increases; and detection means for detecting the number of reception frames;

wherein the third turning speed is controlled based on the number of reception frames detected by said detection means.

16. A camera controlling apparatus according to claim 15, wherein the third turning speed increases stepwise as the number of reception frames increases.

17. A camera controlling apparatus according to claim 10, wherein the first, second and third turning speeds are selected from within a menu displayed on said monitor in said self room.

18. A camera controlling apparatus according to claim 10, further comprising a memory connected to said preset control means and storing information indicating a position to which said camera in said self room is to be moved.

19. A camera controlling apparatus for a television conference system wherein a camera and a monitor are installed in each of a self room and an other party room and an image of said self room or said other party room is transmitted by way of a communication line and reflected on said monitor in said other party room or said self room, said camera controlling apparatus comprising:

preset control means for outputting a preset control signal for moving said camera in said self room at a first turning speed to a predetermined point;

self room manual control means for outputting a self room manual control signal for moving said camera in said self room at a second turning speed lower than the first turning speed in response to a manual signal transmitted thereto from said other party room by way of said communication line;

reception manual control means for outputting a reception manual control signal for moving said camera in said self room at a third turning speed lower than the second turning speed in response to a manual signal transmitted thereto from said other party room by way of said communication line;

speed control means connected to said preset control means, said self room manual control means and said reception manual control means for turning said camera in said self room at a turning speed indicated by any of the preset control signal, the self room manual control signal and the reception manual control signal; and reception manual signal discriminating means for discriminating whether a manual signal transmitted from said other party room through the communication line includes an information of a turning speed of said camera in the self room, said reception manual signal discriminating means sending the manual signal directly to said speed control means if the manual signal includes the information of the turning speed and sending the manual signal to said reception manual control means if the manual signal does not include the information of the turning speed.

* * * * *